(12) United States Patent
Rouzade et al.

(10) Patent No.: US 12,071,215 B2
(45) Date of Patent: Aug. 27, 2024

(54) AIRCRAFT DOOR COMPRISING AN ENGAGING MECHANISM PROVIDING ENGAGEMENT BETWEEN AN EXTERNAL OPENING/CLOSING LEVER AND AN INTERNAL OPENING/CLOSING LEVER

(71) Applicant: LATECOERE, Toulouse Occitanie (FR)

(72) Inventors: Emmanuel Rouzade, Bessieres Occitaine (FR); Gregory Dubosc, Girolles Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 214 days.

(21) Appl. No.: 17/759,655

(22) PCT Filed: Jan. 26, 2021

(86) PCT No.: PCT/EP2021/051672
§ 371 (c)(1),
(2) Date: Jul. 28, 2022

(87) PCT Pub. No.: WO2021/151859
PCT Pub. Date: Aug. 5, 2021

(65) Prior Publication Data
US 2023/0082363 A1    Mar. 16, 2023

(30) Foreign Application Priority Data
Jan. 29, 2020  (FR) ...................................... 2000884

(51) Int. Cl.
*B64C 1/14*  (2006.01)

(52) U.S. Cl.
CPC .................................. *B64C 1/1423* (2013.01)

(58) Field of Classification Search
CPC ..... B64C 1/1423; B64C 1/1461; B64C 1/143; B64C 1/1438; B64C 1/1407
See application file for complete search history.

(56) References Cited

U.S. PATENT DOCUMENTS

| | | |
|---|---|---|
| 4,106,729 A | 8/1978 | Bergman |
| 4,470,566 A | 9/1984 | Fitzgerald |
| 5,156,359 A | 10/1992 | Noble |
| 5,636,814 A | 6/1997 | Rollert |
| 6,059,231 A | 5/2000 | Dessenberger |
| 6,116,542 A | 9/2000 | Erben |

(Continued)

*Primary Examiner* — Christopher D Hutchens
(74) *Attorney, Agent, or Firm* — Defillo & Associates, Inc.; Evelyn A. Defillo

(57) ABSTRACT

An aircraft door including an external opening/closing lever (7) and an internal opening/closing lever (9) which are coupled by an engaging mechanism (12) which includes: a stop (24) which entrains a counter-stop (23) when the internal opening/closing lever (9) is in its closed position and the external opening/closing lever (7) is pivoted from its closed position to its open position; a lug (22) that rotates as one with the internal opening/closing lever; an engaging pawl (15) which is spaced apart from the path of the lug (22) in a passive position, and disposed on the path of the lug (22) in an active position; a support base (16) designed to push the engaging pawl (15) back into its passive position when the external opening/closing lever (7) is in its closed position.

15 Claims, 8 Drawing Sheets

(56) References Cited

U.S. PATENT DOCUMENTS

| | | | |
|---|---|---|---|
| 2015/0375845 A1* | 12/2015 | Salgues | B64C 1/32 |
| | | | 244/129.5 |
| 2017/0129585 A1* | 5/2017 | Erben | E05B 17/2034 |
| 2022/0324547 A1* | 10/2022 | Rouzade | B64C 1/1423 |
| 2023/0082363 A1* | 3/2023 | Rouzade | B64C 1/1423 |
| | | | 244/129.5 |

* cited by examiner

AIRCRAFT DOOR COMPRISING AN ENGAGING MECHANISM PROVIDING ENGAGEMENT BETWEEN AN EXTERNAL OPENING/CLOSING LEVER AND AN INTERNAL OPENING/CLOSING LEVER

CROSS REFERENCE TO RELATED APPLICATION

This application is a national stage entry of PCT/EP2021/051672 filed Jan. 26, 2021, under the International Convention and claiming priority over French Patent Application No. FR2000884 filed Jan. 29, 2020.

TECHNICAL FIELD

The invention relates to the field of aeronautics and relates more particularly to the means for opening and closing aircraft doors.

Certain aircraft doors, for example the access doors to the cabin, are equipped with an external opening/closing lever which makes it possible to actuate the door from outside the aircraft, and with an internal opening/closing lever which makes it possible to actuate the door from inside the cabin. These two levers generally actuate a single mechanism making the opening and the closing, and also the locking and the unlocking, of the door possible. In this case, an engaging mechanism is generally provided for coupling the external opening/closing lever to the internal opening/closing lever and allowing, during certain operating phases of the door, one of the levers to be driven in rotation conjointly with the rotation of the other lever.

PRIOR ART

The aircraft doors used at present comprise an external opening/closing lever which retracts into the profile of the outer panel and which comprises an access hatch to a handle. These doors comprise an engaging mechanism actuated by the access hatch. When a user wishes to open the door from the outside, they push back the access hatch, which is movable, in order to grasp the handle. The movement of this movable access hatch is transmitted to the engaging mechanism which thus couples the external opening/closing lever with the internal opening/closing lever.

Such an aircraft door comprises, notably at its engaging mechanism and the mechanism permitting the transmission of the movements of the movable access hatch, a large number of movable components which constitute a source of costs, weight and failure risks and which require suitable maintenance.

Furthermore, this type of door from the prior art requires the presence of a movable hatch, articulated on the external opening/closing lever, for the operation of the engaging mechanism, and this limits the design possibilities for the external opening/closing lever and the aircraft door overall.

Documents U.S. Pat. Nos. 5,636,814 and 6,116,542 also describe aircraft doors comprising an internal lever and an external lever.

DISCLOSURE OF THE INVENTION

The object of the invention is to improve the aircraft doors of the prior art.

To this end, the invention concerns an aircraft door having:
a door structure on its internal face;
an outer panel on its external face;
an external opening/closing lever, pivoting between a closed position, in which it retracts into the outer panel, and an open position;
an internal opening/closing lever disposed on the internal face of the door, this internal opening/closing lever pivoting between a closed position and an open position;
an engaging mechanism designed to couple the external opening/closing lever to the internal opening/closing lever.

In this aircraft door, the engaging mechanism includes:
a stop that rotates as one with the external opening/closing lever and a counter-stop that rotates as one with the internal opening/closing lever, the stop being designed to entrain the counter-stop when the internal opening/closing lever is in its closed position and the external opening/closing lever is pivoted from its closed position to its open position;
a lug that rotates as one with the internal opening/closing lever and exhibits a circular path when the internal opening/closing lever is pivoted;
an engaging pawl mounted so as to pivot on an axle which rotates as one with the external opening/closing lever, between a passive position in which the engaging pawl is spaced apart from the path of the lug, and an active position in which the engaging pawl is disposed on the path of the lug;
a support base secured to the door structure and designed to push the engaging pawl back into its passive position when the external opening/closing lever is in its closed position.

Such an aircraft door has an engaging mechanism, the number of components of which has been greatly reduced with respect to the prior art. A gain in material, weight and reliability is thus obtained by virtue of the invention.

In addition, this aircraft door does not require the presence of an access hatch articulated on the external opening/closing lever. If an access hatch is required for closing off any orifice for grasping a handle, this hatch may be completely independent of the external opening/closing lever and may be arranged, for example, directly on the outer panel. The invention permits new possibilities for arranging levers within the aircraft door by overcoming the need for the user to actuate an engaging mechanism.

Such an aircraft door also benefits from an engaging mechanism that may benefit from additional protection permitted by this new arrangement of the engaging mechanism.

The aircraft door according to the invention may comprise the following additional features, taken alone or in combination:
the engaging pawl comprises a heel designed to cooperate with an end piece of the support base: when the external opening/closing lever is in its closed position, the end piece of the support base is designed to push back the heel and to pivot the engaging pawl into its passive position; when the external opening/closing lever is out of its closed position, the end piece of the support base is spaced apart from the heel and the engaging pawl is designed to pivot into its active position under the effect of an elastic return element;
the engaging pawl comprises a head which has a rounded profile and which is designed to cooperate with the lug according to a linear connection;
the engaging pawl is mounted so as to pivot directly on the external opening/closing lever;

the engaging mechanism comprises an engaging ring that rotates as one with the internal opening/closing lever, the lug and the counter-stop each being formed by a step made on the engaging ring;

the door comprises an opening/closing mechanism controlled by the rotation of a control shaft about its longitudinal axis, the internal opening/closing lever rotating as one with the control shaft; and the engaging ring rotates as one with the control shaft;

the external opening/closing lever is mounted in a pivot connection about the control shaft;

the stop is formed on the external opening/closing lever, facing the counter-stop;

the engaging pawl is mounted so as to pivot on an element that rotates as one with the external opening/closing lever;

the engaging mechanism comprises an engaging ring that rotates as one with the external opening/closing lever, the stop being formed on the engaging ring by a step made on the engaging ring;

the engaging pawl is in a pivot connection with the engaging ring;

the door comprises an opening/closing mechanism controlled by the rotation of a control shaft about its longitudinal axis, the internal opening/closing lever rotating as one with the control shaft; and the engaging mechanism comprises an engaging shaft whose axis of rotation is parallel to the axis of the control shaft, the engaging ring rotating as one with the engaging shaft;

the external opening/closing lever rotates as one with the engaging shaft;

the counter-stop is fixed to the internal opening/closing lever;

the door comprises an airtight chamber of the external opening/closing lever, the engaging mechanism being situated on the internal face of the aircraft door, outside the airtight chamber.

DESCRIPTION OF THE FIGURES

Other features and advantages of the invention will emerge from the nonlimiting description which follows, with reference to the appended drawings in which.

DETAILED DESCRIPTION

Figure 1:
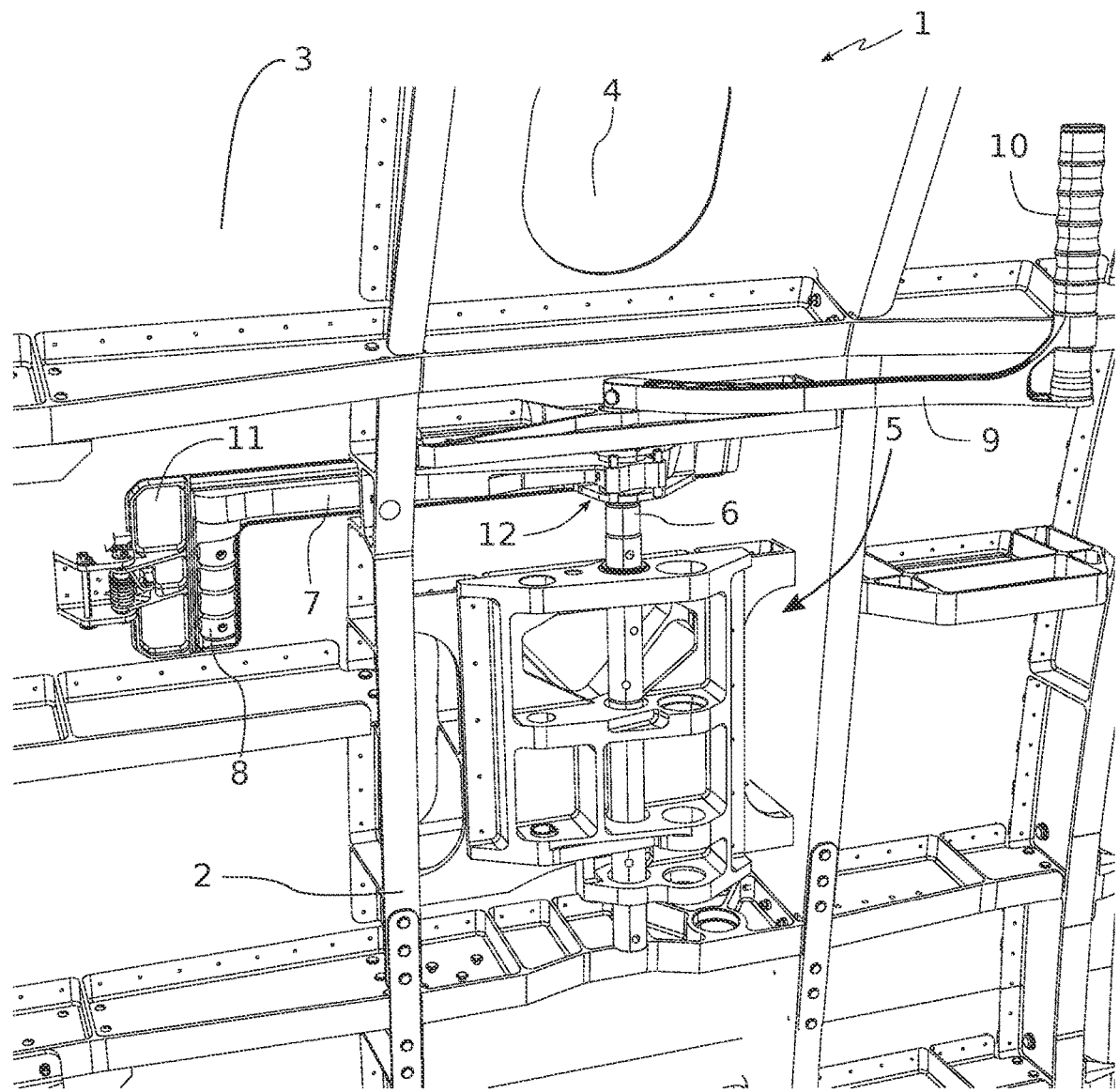
FIG. 1 is a general view of an aircraft door according to the invention.

FIG. 1 is a partial representation of an aircraft door 1 according to the invention, viewed from the inside of the aircraft. The face of the door visible in FIG. 1 is therefore the internal face of the door 1.

This aircraft door 1 consists of a door structure 2 made of assembled beams and intended to ensure the mechanical strength of the assembly. The door 1 also comprises an outer panel 3, also referred to as "skin", which forms the external face of the door 1, is fixed to the structure 2 and is provided for being inserted in the extension of the fuselage of the aircraft with sealing means, when the door 1 is closed. The outer panel 3 may comprise one or more windows 4, and numerous items of equipment and cowlings (not shown) are furthermore mounted in the door structure 2.

Among the possible items of equipment for the door 1, FIG. 1 represents an opening/closing mechanism 5 which makes the opening and the closing of the door, and also the locking and unlocking thereof, possible. This opening/closing mechanism 5 may be any known mechanism suitable for this function and will not be described in more detail here. This opening/closing mechanism 5 is actuated by the rotation of a control shaft 6 about its longitudinal axis.

The unlocking and the opening of the door 1, and also the closing and locking thereof, may be achieved:

from outside the aircraft by actuating a lever referred to as external opening/closing lever 7. In this case, this external lever 7 is equipped with an actuating handle 8 at one of its ends;

from inside the aircraft by actuating a lever referred to as internal opening/closing lever 9. In this case, this internal lever 9 is equipped with an actuating handle 10 at one of its ends.

Figure 2:
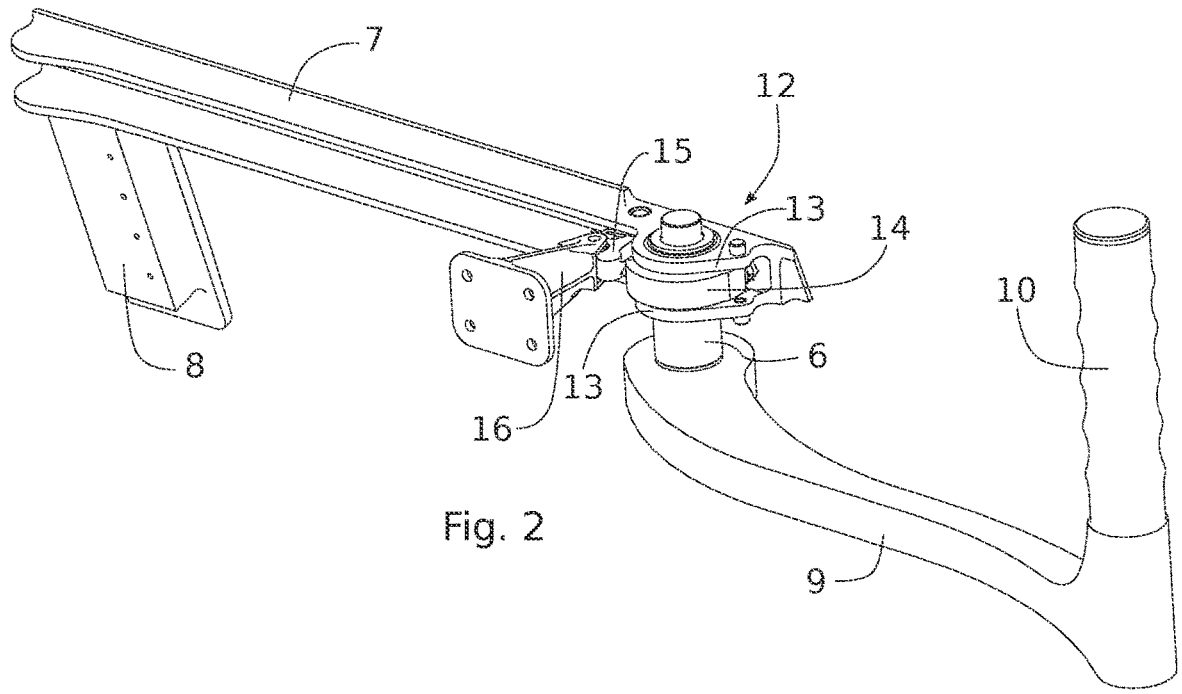
FIG. 2 is a perspective view of the opening/closing levers and of the engaging mechanism of the door in FIG. 1, according to a first embodiment.

The external lever 7 and internal lever 9 are each movable in rotation between two extreme positions: a closed position and an open position. In FIG. 2, the two levers 7, 9 are in their closed position. The external lever 7 and its handle 8 have a smooth external shape which is intended to retract into the outer panel 3, that is to say that the external surface of the external lever 7 aligns with the general profile of the outer panel 3, when the external lever 7 is in its closed position, for aerodynamic reasons.

In addition, the door 1 is equipped with a retractable hatch 11 which is mounted so as to pivot directly on the outer skin 3, which is independent of the external lever 7 and which is urged by a return spring toward a closed position (the one shown in FIG. 1). When the user wishes to grasp the handle 8 of the external lever 7 from the outside, they push the retractable hatch 11 back toward the inside of the aircraft.

In the present example, the internal lever 9 rotates as one with the control shaft 6, such that the opening/closing mechanism 5 is actuated directly by the rotation of the internal lever 9 which provokes the rotation of the control shaft 6.

The external lever 7 is, for its part, mounted so as to rotate on the control shaft 6, and its coupling in rotation to the internal lever 9 is realized by an engaging mechanism 12. The engaging mechanism 12 makes it possible, in certain opening or closing sequences, to couple the levers 7, 9 such that the rotation of the external lever 7 leads to the rotation of the internal lever 9, this leading to the rotation of the control shaft 6, and the rotation of the control shaft finally leading to the actuation of the opening/closing mechanism 5.

FIG. 2 is a perspective view of the assembly formed by the external lever 7, the internal lever 9 and the engaging mechanism 12. The upper portion of the control shaft 6 is also visible.

In this case, the internal lever 9 is fixed directly to the control shaft 6, for example by clamping, keying, or any other suitable means. The external lever 7 is mounted so as to rotate on the control shaft 6 by virtue of a bearing composed of two flanges 13 on which the control shaft 6 is mounted according to a pivot connection, by virtue of rolling bearings or any other suitable means.

In this case, the engaging mechanism 12 comprises an engaging ring 14 which rotates as one with the control shaft 6. The engaging ring 14 may be directly mounted clamped on the control shaft 6 or may be made to rotate as one with the control shaft 6 by any means, such as splines.

The control shaft 6, the internal lever 9 and the engaging ring 14 form a solidly connected assembly, and the driving of the internal lever 9 in rotation by way of its handle 10 leads to the rotation of the assembly. The external lever 7 is in a pivot connection with this assembly, its rotation about the control shaft 6 being free and independent of this assembly, if not the action of the engaging mechanism 12.

The engaging mechanism 12 includes:
- an engaging pawl 15 mounted so as to pivot on an axle 19 which rotates as one with the external lever 7 (in this example, the axle 19 is mounted directly on the external lever 7);
- a support base 16 which is fixed to the door structure 2, and which is therefore fixed with respect to the rotational movements of the levers 7, 9, this support base 16 being designed to cooperate with the engaging pawl 15;
- a stop 24 which is, in the present example, machined directly on the body of the external lever 7;
- the engaging ring 14.

Figure 3:
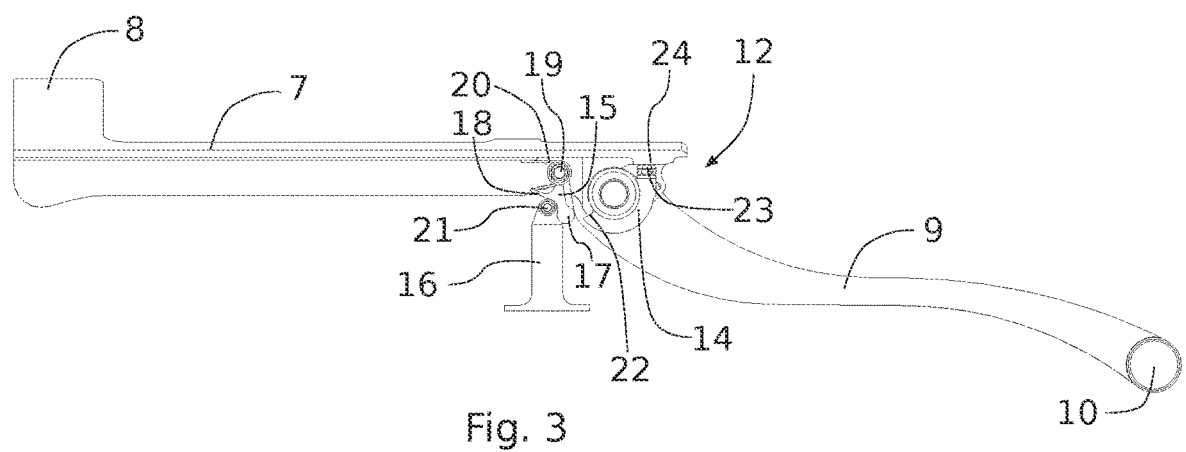
FIG. 3 is a top view in section of the assembly in FIG. 2.

FIG. 3 is a top view of FIG. 2, in section along a horizontal plane cutting the external lever 7 along its longitudinal direction.

FIG. 3 renders visible in particular the profile of the engaging pawl 15 which comprises a head 17 and a heel 18 on which an exerted force may actuate the rotation of the pawl 15 about its axle 19.

The pawl 15 is mounted so as to rotate on the external lever 7, about the axle 19, between two extreme positions referred to as active and passive. A return spring 20 urges the pawl 15 toward its active position. In FIG. 3, the pawl 15 is in its passive position since the external lever 7 is in its closed position, and this forces the heel 18 to be pushed back by the support base 16.

The support base 16 comprises, in the present example, an end piece 21 intended to cooperate with the heel 18. The end piece 21 is preferably composed of a rolling bearing which makes it possible to roll on the heel 18 without sliding. The support base 16 is dimensioned and positioned such that, when the external lever 7 is in its closed position, the end piece 21 pushes on the heel 18 to a sufficient extent to provoke the pivoting of the pawl 15 and its retention in its passive position. This configuration is the one shown in FIG. 3.

The engaging ring 14 has an overall circular shape but nevertheless comprises a lug 22 and a counter-stop 23 which is intended to cooperate with the stop 24 situated on the internal lever 9. The lug 22 and the counter-stop 23 are in this case each formed by a step machined on the engaging ring 14. Optionally, the counter-stop 23 is equipped with an adjusting screw for adjusting its point of contact with the stop 24.

The lug 22 exhibits a possible path which is circular and which corresponds to the rotation of the engaging ring 14 conjointly with the control shaft 6 about the longitudinal axis of the control shaft 6.

When the pawl 15 is in its passive position (see FIG. 3), its head 17 is spaced apart from the path of the lug 22, that is to say that when the internal lever 9 is actuated in rotation, the lug 22 cannot meet the head 17 of the pawl 15. Conversely, when the pawl 15 is in its active position (see, for example, FIG. 6), the head 17 of the pawl 15 is then disposed in the path of the lug 22.

The counter-stop 23 is, for its part, always in the path of the stop 24.

Sequences for opening and closing the aircraft door 1 will now be described with reference to FIGS. 3 to 10.

In the starting position in FIG. 3, the levers 7, 9 are both in their closed position, this corresponding in particular to a configuration with a closed and locked door which permits, for example, the flight of the aircraft.

Figure 4:
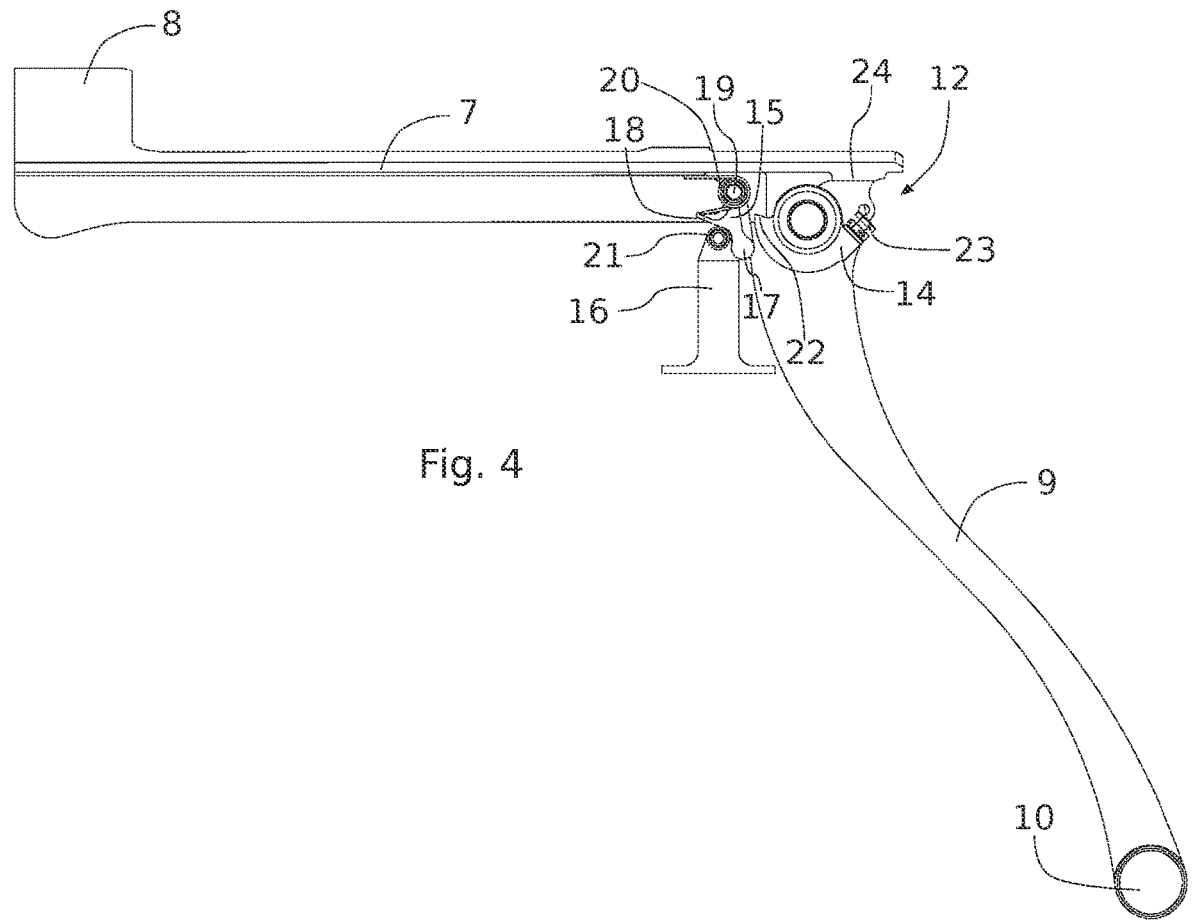
FIG. 4 is a view of the assembly in FIG. 3 in a first position during a sequence for opening from inside the aircraft.
Figure 5:
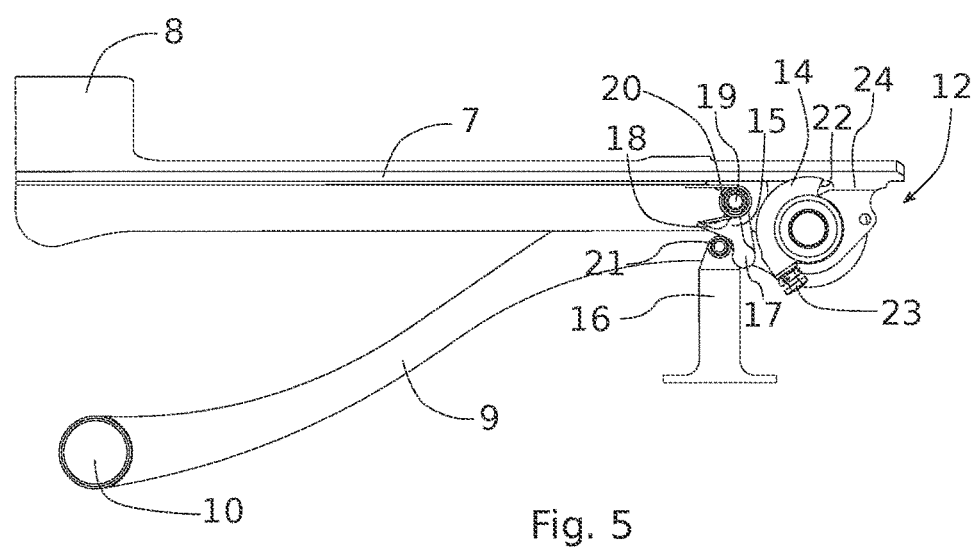
FIG. 5 is a view of the assembly in FIG. 3 in a second position during a sequence for opening from inside the aircraft.

From this position in FIG. 3, when the required safety conditions have been met, a user may control the opening of the door from inside the cabin of the aircraft. FIG. 4 illustrates the actuation in rotation of the internal lever 9 which the user has grasped by its handle 10. The assembly formed by the internal lever 9, the control shaft 6 and the engaging ring 14 is thus driven in rotation. The counter-stop 23 separates from the stop 24 and the lug 22 travels along its circular path without meeting the engaging pawl 15, the latter being in its passive position. FIG. 5 illustrates the end of the movement of the internal lever 9, which allows the door to be opened, the internal lever 9 then being in its open position after having traveled along its entire angular path and come into abutment. In the position in FIG. 5, the opening/closing mechanism 5 has been actuated all the way by actuating only the internal lever 9 while the external lever 7 has remained in its closed position. During this sequence for opening from the inside, the external lever 7 is disengaged and is not influenced by the internal lever 9.

The aircraft door is thus actuated in an entirely safe manner from the inside, by virtue of the engaging mechanism 12, without any actuation of movable elements on the external face of the door.

Figure 6:
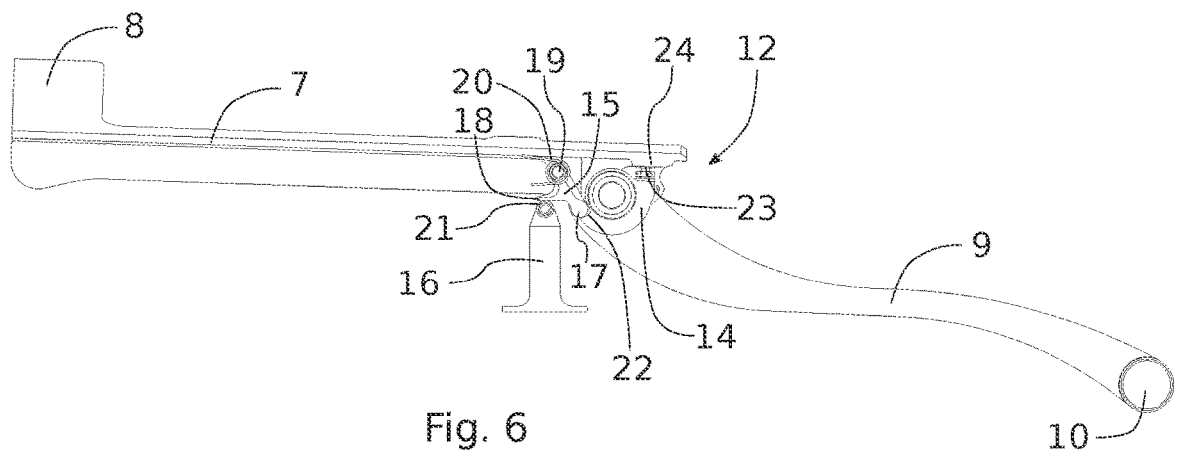
FIG. 6 is a view of the assembly in FIG. 3 in a first position during a sequence for opening from outside the aircraft.
Figure 7:
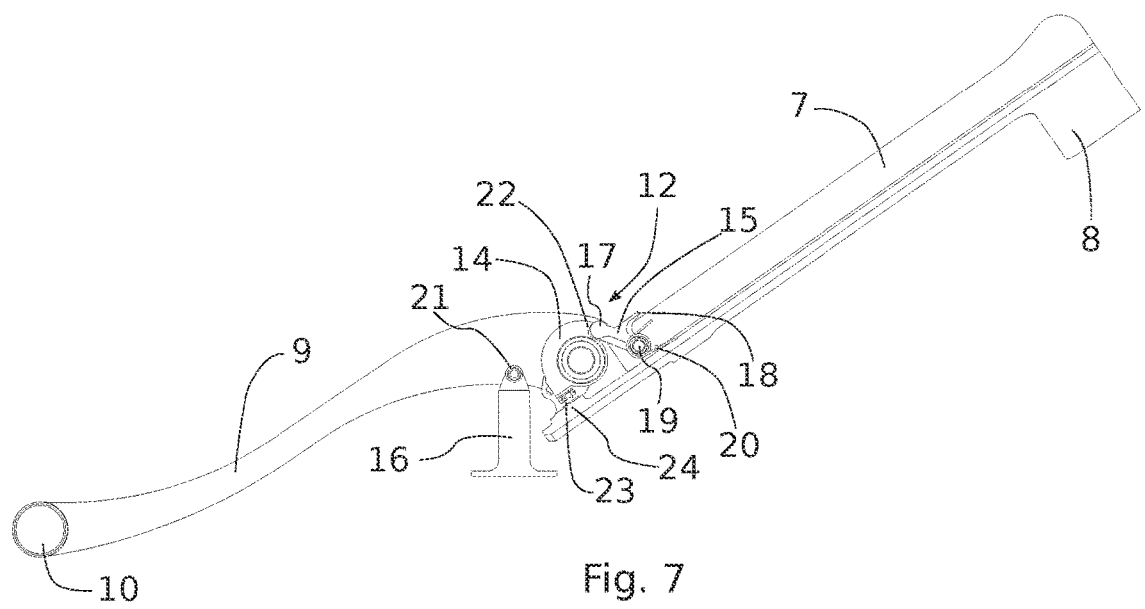
FIG. 7 is a view of the assembly in FIG. 3 in a second position during a sequence for opening from outside the aircraft.

FIGS. 6 and 7 illustrate, for their part, a sequence for opening the door from outside the aircraft.

From the starting position in FIG. 3, the handle 8 of the external lever 7 is actuated by a user, which drives the external lever 7 in rotation. The rotation of the external lever 7 causes the stop 24 to push back the counter-stop 23 and therefore to also drive the internal lever 9 in rotation. The levers 7, 9 are thus engaged, in this direction of rotation.

FIG. 6 illustrates a first phase of this movement in which the external lever 7 has pivoted by a small angular travel. In the present example, the external lever 7 has pivoted by 2° between its position in FIG. 3 and its position in FIG. 6. In addition, this first phase of the movement allows the pawl 15 to be released since, the support base 16 being secured to the door structure 2, the rotational movement of the external lever 7 causes the heel 18 to move away from the end piece 21 such that the support base 16 no longer retains the pawl 15 in its passive position, and said pawl then swings into its active position under the effect of the return spring 20. This first phase of the rotation of the external lever 7 therefore has the consequence of placing the pawl 15 on the path of the lug 22.

However, taking account of the direction of rotation of the external lever 7, the pawl 15 is not made to cooperate with the lug 22 during this opening phase, but is thus prepared for the closing phase. Only the stop 24 pushes back the counter-stop 23 such that the rotation of the external lever 7 leads to the rotation of the internal lever 9.

The rotation of the external lever 7 is then continued by the user as far as the end-of-travel position illustrated in FIG. 7, in which the external lever 7 is in its open position. The internal lever 9 itself has also been driven as far as its open position, and this has led to the rotation of the control shaft 6 and therefore the opening/closing mechanism 5.

Once the door has thus been opened from outside the aircraft, the door can be closed again equally by virtue of the internal lever 9 or the external lever 7:

the actuation of the internal lever 9 toward its closed position leads directly to the rotation of the control shaft 6;

the actuation of the external lever 7 to return toward its closed position this time also leads to the rotation of the internal lever 9 by virtue of the cooperation between the pawl 15 and the lug 22. Specifically, the head 17 of the pawl 15 pushes back the lug 22 when the external lever 7 is actuated toward its closed position, and couples the external lever 7 and the internal lever 9 in rotation, in this direction of rotation.

The head 17 of the pawl 15 has a curved profile (the profile is in this case in the form of an arc of a circle) permitting a (theoretical) linear connection when the head 17 pushes back the heel 18.

Figure 8:
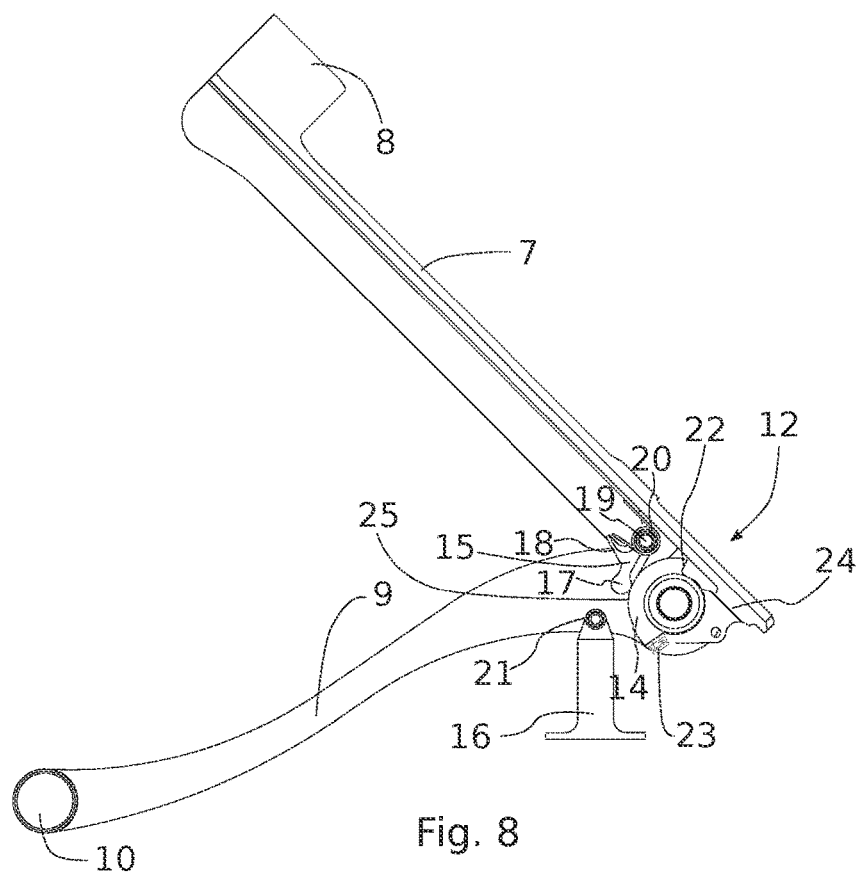
FIG. 8 is a view of the assembly in FIG. 3 in a first position during a sequence for closing the door from the outside, after having been opened from the inside.
Figure 9:
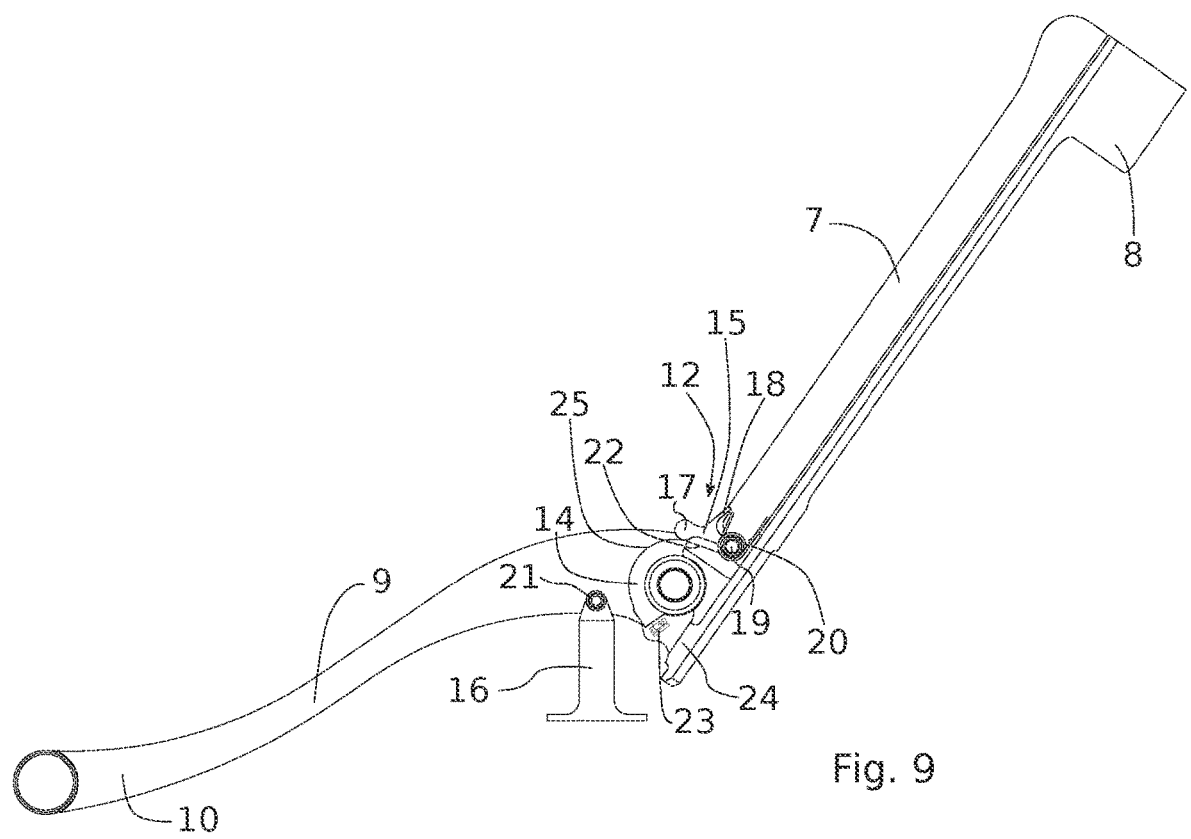
FIG. 9 is a view of the assembly in FIG. 3 in a second position during a sequence for closing the door from the outside, after having been opened from the inside.
Figure 10:
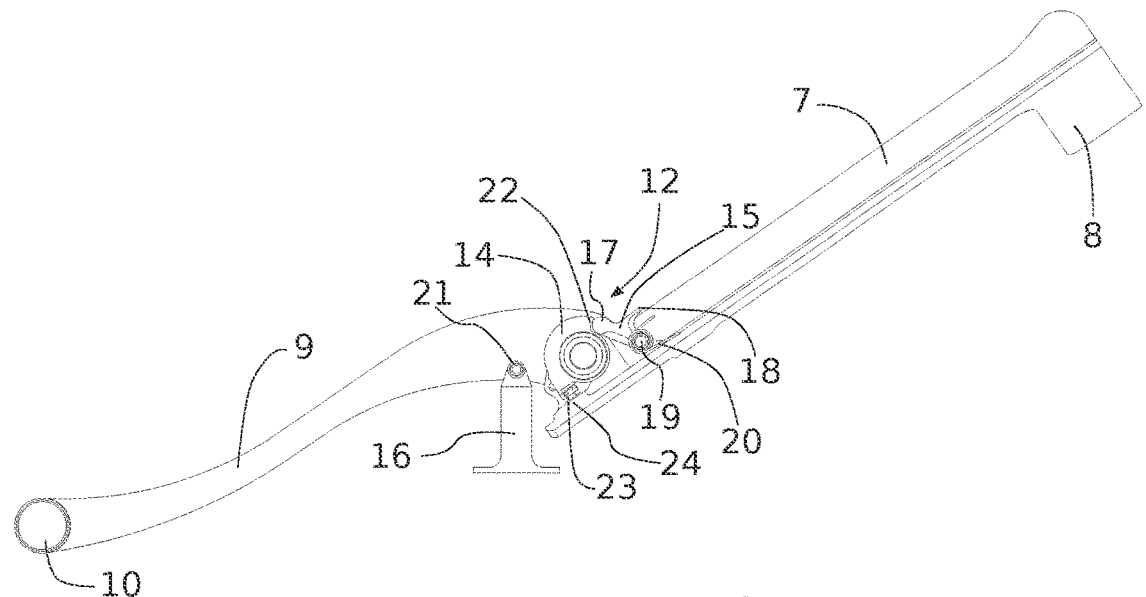
FIG. 10 is a view of the assembly in FIG. 3 in a third position during a sequence for closing the door from the outside, after having been opened from the inside.

FIGS. 8 to 10 illustrate a sequence in which the engaging mechanism allows the door to be closed using the external lever 7, after opening using the internal lever 9.

The door is therefore firstly opened by actuating the internal lever 9 from inside the aircraft, until the position in FIG. 5 is reached. From this position, in which the external lever 7 is in its closed position while the internal lever 9 is in its open position, the external lever 7 is then actuated with a view to closing the door again from outside the aircraft.

The external lever 7 is then firstly brought back from its closed position (FIG. 5) to its open position. FIG. 8 illustrates the actuation in rotation of the external lever 7 by the user, midway between its closed position and its open position. During this travel, the pawl 15 is released from its passive position due to the movement of the pawl 15 away from the support base 16. The return spring 20 then urges the pawl 15 toward its active position, but said pawl still cannot directly reach its active position because it abuts against the circular surface of the engaging ring 14, which constitutes a ramp 25. The rotational movement of the external lever 7 continues with the head 17 of the pawl 15 sliding on the ramp 25 in the direction of the lug 22, as far as the position in FIG. 9 in which the head 17 comes level with the lug 22.

From the position in FIG. 9, the continuation of the rotational movement of the external lever 7 leads to the position in FIG. 10 in which the head 17 of the pawl 15 swings in front of the lug 22 under the effect of the return spring 20. In this FIG. 10, the external lever 7 is therefore in an open position, as is the internal lever 9. This position in FIG. 10 therefore corresponds exactly to the position in FIG. 7 illustrating the end of the opening sequence by the external lever 7. From this position in FIG. 10, like that in FIG. 7, the door can therefore be closed directly by the rotation of the external lever 7, this time in the opposite direction, to return this external lever 7 to its closed position, this rotation leading to the rotation of the internal lever 9 by virtue of the pawl 15 which drives the engaging ring 14 in rotation by pushing back its lug 22, as described above.

Figure 11:
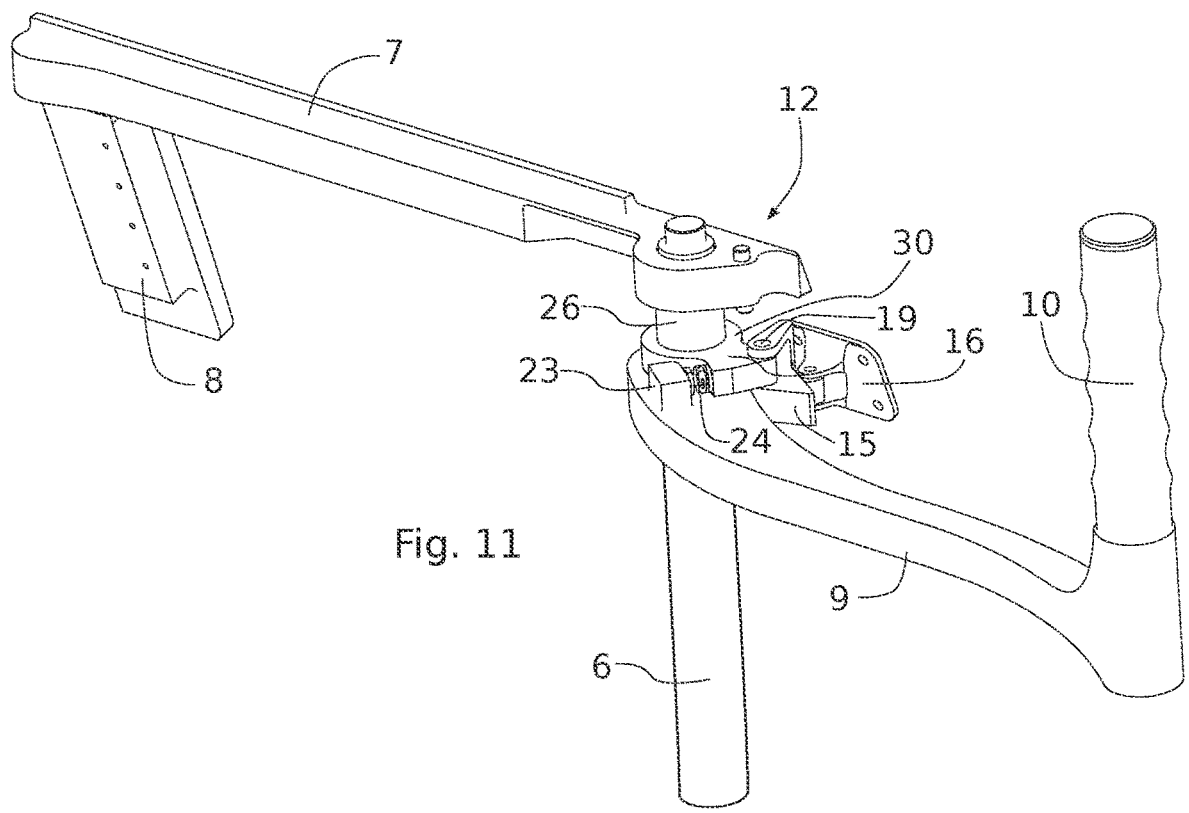
FIG. 11 is a perspective view of the opening/closing levers and of the engaging mechanism of the door in FIG. 1, according to a second embodiment.
Figure 12:
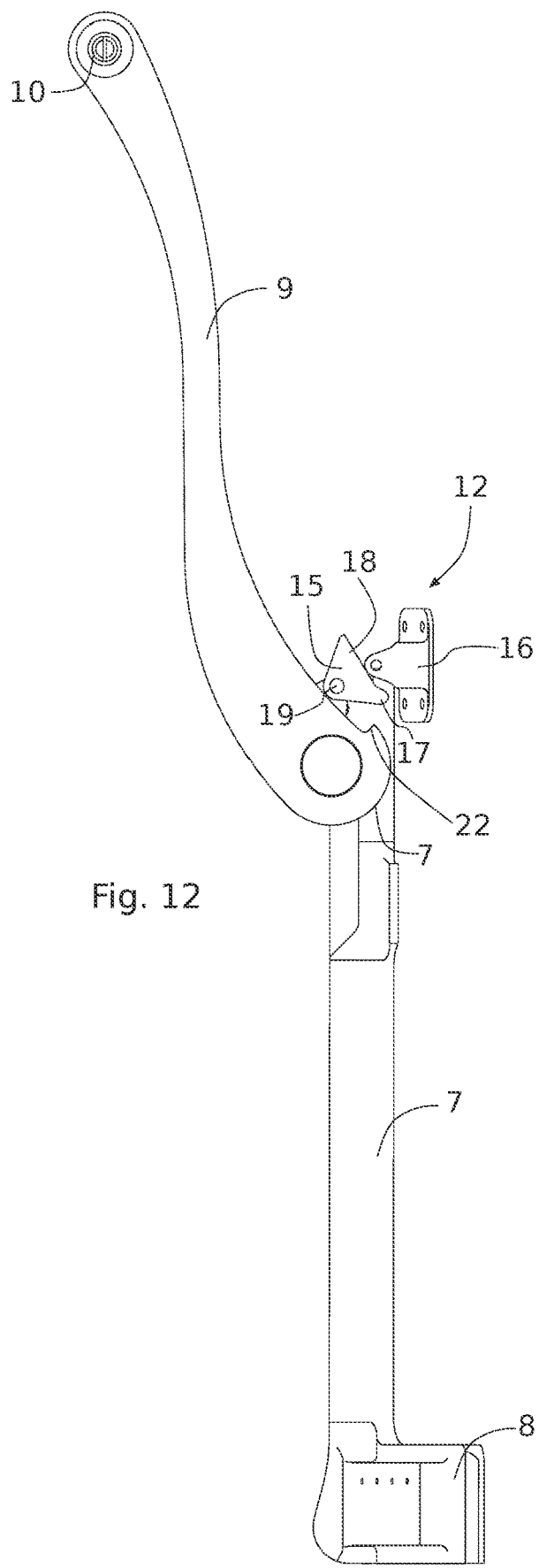
FIG. 12 is a bottom view of the assembly in FIG. 11.
Figure 13:
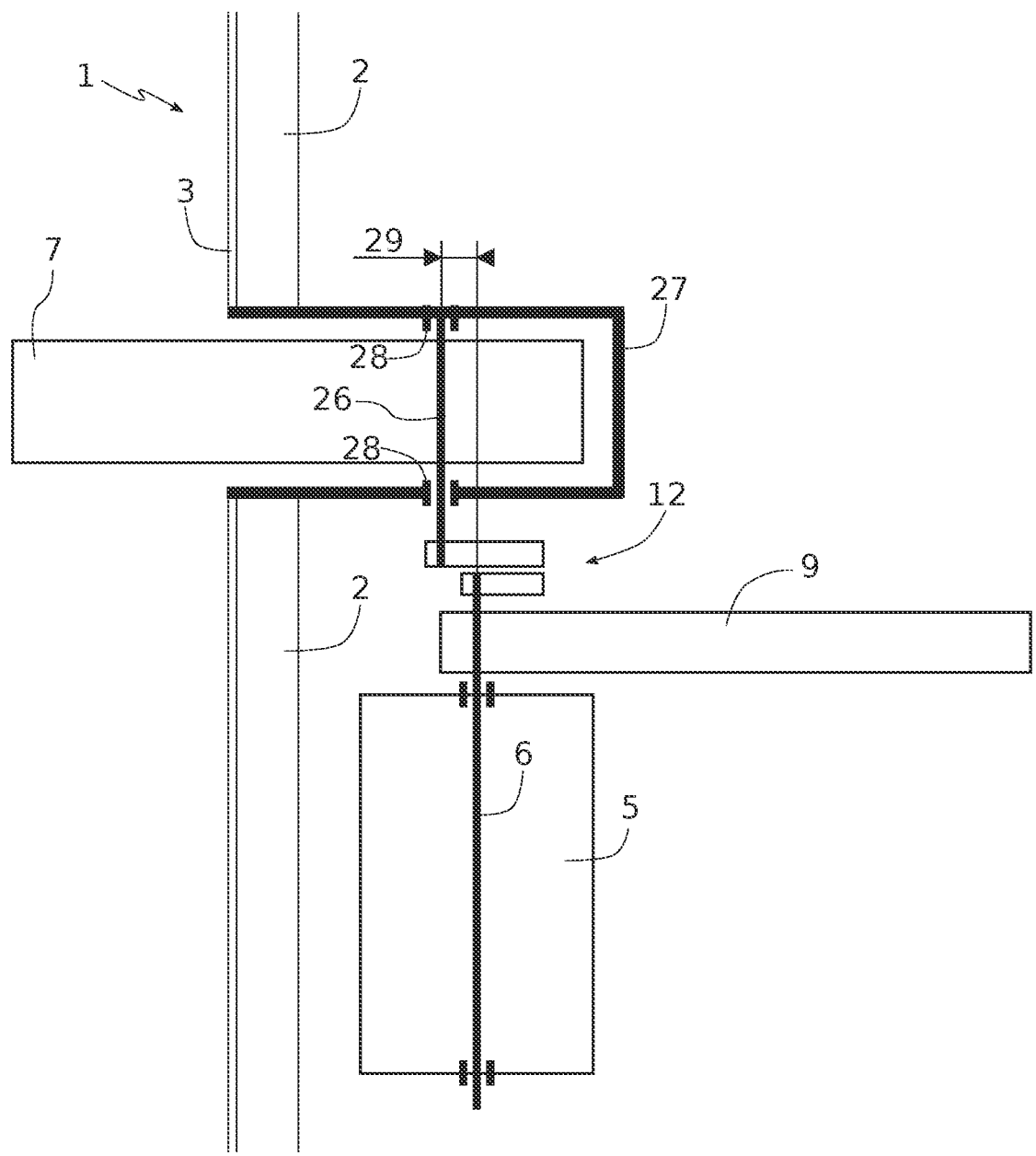
FIG. 13 is a schematic view in section of the aircraft door according to the second embodiment.

FIGS. 11 to 13 illustrates a second embodiment of the invention. This second embodiment relates to a variant of the engaging mechanism 12. The other elements of the door are identical or similar, and these elements which are common to the two embodiments bear the same numerals referring to the figures.

According to this second embodiment, the engaging mechanism 12 comprises an engaging shaft 26 disposed in the extension of the control shaft 6 of the opening/closing mechanism 5. The shafts 6 and 26 are simply disposed in the extension of one another and do not have any coupling means other than the engaging mechanism 12. A new engaging ring 30 is in this case secured to the engaging shaft 26, as is the external lever 7. The external lever 7, the engaging shaft 26 and the engaging ring 30 thus form a solidly connected assembly which can be actuated in rotation by the actuation of the external lever 7, this actuation driving the assembly in rotation about the longitudinal axis of the engaging shaft 26. The engaging shaft 26 is mounted so as to rotate freely on the door structure 2, for example by way of bearings (not shown).

The control shaft 6 is secured to the internal lever 9. The control shaft 6 and the internal lever 9 therefore form a solidly connected assembly which can be actuated in rotation about the longitudinal axis of the control shaft 6, independently of the assembly formed by the external lever 7, the engaging shaft 26 and the engaging ring 30, this assembly rotating about the longitudinal axis of the shaft 26.

The engaging ring 30 is also equipped with a stop 24, in this case formed by a step machined on the ring 30, which is designed to cooperate with a counter-stop 23 fixed to the internal lever 9. One or the other of the stop 24 or counter-stop 23 may comprise an adjusting screw allowing the adjustment of the angular position at which contact is made between the stops.

The engaging pawl 15 is in this case mounted so as to pivot directly on the engaging ring 30 and, just like in the first embodiment, the support base 16 is provided for retaining this pawl 15 in its passive position when the external lever 7 is in its closed position.

FIG. 12 is a bottom view of FIG. 11. According to this second embodiment, the lug 22 is secured to the internal lever 9. The internal lever 9 may advantageously be produced as a single component on which both the counter-stop 23 and the lug 22 are machined.

In the position in FIGS. 11 and 12, the two external 7 and internal 9 levers are therefore in a closed position and the pawl 15 is thus retained in its passive position.

The mounting in FIGS. 11 and 12, in accordance with this second embodiment, ensures the same opening and closing sequences as those described in the first embodiment.

Thus, the door can be opened from the inside by actuating the internal lever 9 while the external lever 7 is retained in its closed position.

The opening from outside the aircraft can be achieved by the actuation of the external lever 7 which then drives the internal lever 9 in rotation by virtue of the stop 24 which pushes back the counter-stop 23. In addition, the rotational movement of the external lever 7 spaces the pawl 15 apart from the support base 16, driving the pawl 15 against the ramp 25 and then toward its active position, this allowing the door to be closed again from the outside by the actuation of the external lever 7 to return to its closed position, the internal lever 9 then being actuated in rotation by the pawl 15 which pushes back the lug 22.

In this second embodiment, it is not necessary for the control shaft 6 and the engaging shaft 26 to be coaxial. An offset of these two shafts is possible as long as the stop 24 and the counter-stop 23 are designed to work together, as well as the pawl 15 and the lug 22.

FIG. 13 is a schematic figure illustrating the mounting possibilities for the door according to this second embodiment.

In this schematic view in FIG. 13, the door 1 is viewed in section. In this figure, an airtight chamber 27 has been represented around the external lever 7. Since the external lever 7 is situated on the external face of the door, it necessarily has to be accommodated in an airtight chamber allowing the pressurization inside the cabin of the aircraft to be maintained during the flight. All of the mechanisms passing through this airtight chamber 27 will have to be equipped with seals that are adequate for guaranteeing the airtightness.

This second embodiment makes it possible to simplify the mounting of the external lever 7 in its airtight chamber 27 since this mounting then involves a pivot connection between the chamber 27 and the external lever 7, for example with the aid of airtight bearings 28.

As mentioned above, an offset 29 of the shafts 6, 26 is tolerated by the engaging mechanism 12, and this simplifies the mounting of the assembly and allows significant savings to be made in the mechanical construction of the assembly, insofar as the sequences of dimensions are simplified and the production and mounting tolerances of the components are greater.

The mounting is also simplified since two shorter shafts 6, 26 are easier to mount on bearings, each from their side, rather than a single longer shaft which requires better alignment of the bearings.

In addition, according to this second embodiment, the engaging mechanism 12 is situated outside the airtight chamber 27 and therefore inside the cabin of the aircraft, and is thus better protected from extreme temperatures, dust, bad weather, and other high-altitude atmospheric conditions.

Variant embodiments of the aircraft the door may be implemented. For example, other arrangements of the engaging ring may be provided, and also removal of this engaging ring, as long as the stop rotates as one with the external lever, the lug rotates as one with the internal lever and the engaging pawl is mounted so as to pivot on an axle which rotates as one with the external lever.

The invention claimed is:

1. An aircraft door comprising:
   a door structure (2) on an internal face;
   an outer panel (3) on an external face;
   an external opening/closing lever (7), pivoting between a closed position, in which the lever retracts into the outer panel (3), and an open position;
   an internal opening/closing lever (9) disposed on the internal face of the door, the internal opening/closing lever (9) pivoting between a closed position and an open position;
   an engaging mechanism (12) designed to couple the external opening/closing lever (7) to the internal opening/closing lever;
   wherein the engaging mechanism (12) comprises:
   a stop (24) that rotates as one with the external opening/closing lever (7) and a counter-stop (23) that rotates as one with the internal opening/closing lever (9), the stop (24) being designed to entrain the counter-stop (23) when the internal opening/closing lever (9) is in the closed position and the external opening/closing lever (7) is pivoted from its closed position to the open position;
   a lug (22) that rotates as one with the internal opening/closing lever (9) and exhibits a circular path when the internal opening/closing lever (9) is pivoted;
   an engaging pawl (15) mounted so as to pivot on an axle (19) which rotates as one with the external opening/closing lever (7), between a passive position in which the engaging pawl (15) is spaced apart from the path of the lug (22), and an active position in which the engaging pawl (15) is disposed on the path of the lug (22);
   a support base (16) secured to the door structure (2) and designed to push the engaging pawl (15) back into the passive position when the external opening/closing lever (7) is in the closed position.

2. The aircraft door as claimed in claim 1, wherein the engaging pawl (15) comprises a heel (18) designed to cooperate with an end piece (21) of the support base (16):
   when the external opening/closing lever (7) is in the closed position, the end piece (21) of the support base (16) is designed to push back the heel (18) and to pivot the engaging pawl (15) into the passive position;
   when the external opening/closing lever (7) is out of the closed position, the end piece (21) of the support base (16) is spaced apart from the heel (18) and the engaging pawl (15) is designed to pivot into the active position under the effect of an elastic return element (20).

3. The aircraft door as claimed in claim 1, wherein the engaging pawl (15) comprises a head (17) which has a rounded profile and which is designed to cooperate with the lug (22) according to a linear connection.

4. The aircraft door as claimed in claim 1, wherein the engaging pawl (15) is mounted so as to pivot directly on the external opening/closing lever (7).

5. The aircraft door as claimed in claim 4, wherein the stop (24) is formed on the external opening/closing lever (7), facing the counter-stop (23).

6. The aircraft door as claimed in claim 1, wherein the engaging mechanism (12) comprises an engaging ring (14) that rotates as one with the internal opening/closing lever (9), the lug (22) and the counter-stop (23) each being formed by a step made on the engaging ring (14).

7. The aircraft door as claimed in claim 6, further comprising an opening/closing mechanism (5) controlled by the rotation of a control shaft (6) about its longitudinal axis, the internal opening/closing lever (9) rotating as one with the control shaft (6); wherein the engaging ring (14) rotates as one with the control shaft (6).

8. The aircraft door as claimed in claim 7, wherein the external opening/closing lever (7) is mounted in a pivot connection about the control shaft (6).

9. The aircraft door as claimed in claim 1, wherein the engaging pawl (15) is mounted so as to pivot on an element that rotates as one with the external opening/closing lever (7).

10. The aircraft door as claimed in claim 9, wherein the engaging mechanism (12) comprises an engaging ring (30) that rotates as one with the external opening/closing lever (7), the stop (24) being formed on the engaging ring (30) by a step made on the engaging ring (30).

11. The aircraft door as claimed in claim 10, wherein the engaging pawl (15) is in a pivot connection with the engaging ring (30).

12. The aircraft door as claimed in claim 10, further comprising an opening/closing mechanism (5) controlled by the rotation of a control shaft (6) about a longitudinal axis, the internal opening/closing lever (9) rotating as one with the control shaft (6); and the engaging mechanism (12) comprises an engaging shaft (26) having a rotation axis parallel to the longitudinal axis of the control shaft (6), the engaging ring (30) rotating as one with the engaging shaft (30).

13. The aircraft door as claimed in claim 12, wherein the external opening/closing lever (7) rotates as one with the engaging shaft (30).

14. The aircraft door as claimed in claim 9, wherein the counter-stop (23) is fixed to the internal opening/closing lever (9).

15. The aircraft door as claimed in claim 9, further comprising an airtight chamber (27) of the external opening/closing lever (7), the engaging mechanism (12) being situated on the internal face of the aircraft door, outside the airtight chamber (27).

\* \* \* \* \*